United States Patent
Naseef

(10) Patent No.: US 11,868,910 B2
(45) Date of Patent: Jan. 9, 2024

(54) DEVICE AND METHOD FOR GENERATING TRAINING DATA SETS FOR SIGNAL TYPE RECOGNITION AS WELL AS TRAINING DATA SET

(71) Applicant: Rohde & Schwarz GmbH & Co. KG, Munich (DE)

(72) Inventor: Mahmud Naseef, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 513 days.

(21) Appl. No.: 16/784,070

(22) Filed: Feb. 6, 2020

(65) Prior Publication Data
US 2021/0248488 A1  Aug. 12, 2021

(51) Int. Cl.
*G06N 5/04* (2023.01)
*G06N 20/00* (2019.01)
*H04W 24/02* (2009.01)

(52) U.S. Cl.
CPC .............. *G06N 5/04* (2013.01); *G06N 20/00* (2019.01); *H04W 24/02* (2013.01)

(58) Field of Classification Search
CPC .......... G06N 20/00; G06N 5/04; H04W 24/02
See application file for complete search history.

(56) References Cited

U.S. PATENT DOCUMENTS

| | | | | |
|---|---|---|---|---|
| 2010/0176977 | A1* | 7/2010 | Ranganathan | H03M 1/002 341/122 |
| 2010/0232351 | A1* | 9/2010 | Chansarkar | G01S 19/13 370/320 |
| 2014/0201997 | A1* | 7/2014 | Robertson | H01M 50/20 29/854 |
| 2015/0072740 | A1* | 3/2015 | Gupta | H04B 1/0458 455/571 |
| 2017/0346506 | A1* | 11/2017 | Perumana | H04B 1/0458 |
| 2018/0074210 | A1* | 3/2018 | Glocker | G01S 19/42 |
| 2019/0162767 | A1* | 5/2019 | Wang | G01R 31/2822 |
| 2019/0246299 | A1 | 8/2019 | Roman et al. | |
| 2021/0084601 | A1* | 3/2021 | Rofougaran | H04W 24/08 |
| 2021/0258988 | A1* | 8/2021 | Balakrishnan | G06N 3/088 |

OTHER PUBLICATIONS

Treml et al., "A versatile FMCW Radar System Simulator for Millimeter-Wave Applications", Oct. 2008, Proceeding of the 38th European Microwave Conference (Year: 2008).*
Eliardsson, P., et al., "Artificial Intelligence for Automatic Classification of Unintentional Electromagnetic Interference in Air Traffic Control Communications," 2019 International Symposium on Electromagnetic Compatibility—EMC Europe, pp. 896-901, Sep. 2019.

* cited by examiner

*Primary Examiner* — Raymond S Dean
(74) *Attorney, Agent, or Firm* — CHRISTENSEN O'CONNOR JOHNSON KINDNESS PLLC

(57) ABSTRACT

A device for generating training data sets for signal type recognition has at least one radio frequency signal generator for generating at least one artificial radio frequency signal, a radio frequency receiver connected to the at least one radio frequency signal generator for receiving the at least one artificial radio frequency signal generated by the at least one radio frequency signal generator, and a signal data recorder connected to the radio frequency receiver for storing the radio frequency signal received by the radio frequency receiver as a training data set. Further, a method for generating training data sets as well as a training data set are provided.

17 Claims, 2 Drawing Sheets

DEVICE AND METHOD FOR GENERATING TRAINING DATA SETS FOR SIGNAL TYPE RECOGNITION AS WELL AS TRAINING DATA SET

FIELD OF THE DISCLOSURE

Embodiments of the disclosure relate to a device and a method for generating training data sets for signal type recognition as well as a training data set for signal type recognition.

BACKGROUND

Nowadays, at virtually any location on earth, a plurality of RF signals are present. The plurality of signals is referred to as a real life signal in the following.

In most urban areas, usually multiple cellular signals of telecommunication providers, DVB signals for television and radio broadcasting, WLAN signals, GNSS signals for navigation and various IoT signals are present.

The presence of the plurality of signals does not pose a problem to functionality of the respective data transmissions. It may, nonetheless, be of importance to recognize and identify a specific signal type in the real life signal, for example for troubleshooting. In this case, it is important to identify an interfering device in order to be able to offer a reliable service or data transmission.

It is known to use devices for signal type recognition relying on machine learning modules, for example trained artificial neural networks capable of recognizing and identifying a specific signal type from real life signals.

In order to perform the training of the machine learning modules, data sets of real life signals are needed. Such training data sets may be obtained by actual real life measurements in various environments. Naturally, those measurements are expensive to obtain and usually suffer of low resolution and dynamic range due to the hardware limitations of the antennas used. Also, very long recordings are difficult to obtain due to hardware limitations of the recording system.

SUMMARY

Thus, there is a need for low noise, high resolution, high dynamic range training data sets for signal type recognition, i.e. data sets suitable for training a machine learning circuit or module to recognize specific signal types.

For this purpose, a device for generating training data sets for signal type recognition is provided. In an embodiment, the device comprises at least one radio frequency signal generator for generating at least one artificial radio frequency signal, a radio frequency receiver connected to the at least one radio frequency signal generator for receiving the at least one artificial radio frequency signal generated by the at least one radio frequency signal generator, and a signal data recorder connected to the radio frequency receiver for storing the radio frequency signal received by the radio frequency receiver as a training data set.

The solution is based on the idea that training data sets may also be generated by emulating a real life signal, i.e. by artificially creating the plurality of radio frequency signals usually present in a real life signal. This is advantageous, as artificial signals suffer of less noise and have a better resolution and a high dynamic range than measured signals. Also, very long recordings and thus long data sets are possible as the hardware does not need to be mobile.

The artificial signals are for example analog signals. Digitizing of artificial signals may be done by the radio frequency signal generator or the signal data recorder.

The at least one radio frequency signal generator may be configured to generate more than one artificial signal simultaneously.

For example, the at least one artificial radio frequency signal is a signal according to a predefined signal type to create the training data set according to specific needs.

In an embodiment, the signal type of at least one of the artificial signal is the signal type to be recognized so that data sets are created that are particularly suited for training toward recognizing the predefined signal type.

For creating training data sets with real life relevance, the signal class of the at least one artificial radio frequency signal is a 5G signal, a LTE signal, a FDD/HSPA/HSPA+ signal, a GSM/EDGE/EDGE Evolution signal, a TD-SCDMA signal, a WLAN signal, a WiMAX signal, a GNSS signal, a OneWeb signal, a DVB-S2/DVB-S2X signal, a OFDM signal, a radar signal or a signal according to a standard used by IoT-devices.

The GNSS may be a GPS, Glonass, Galileo, BeiDou and/or QZSS/SBAS signal, for example. A standard used by IoT-devices may be a M2M- or V2X-communication standard.

For example, within the standard of the predetermined signal class of the at least one artificial signal, the contents of the at least one artificial signal are entirely predetermined, entirely random or partly random and partly predetermined. This way, fully predefined real life scenarios may be created or the effort for creating the training data sets may be reduced.

In an aspect, the at least one radio frequency signal generator is configured to emulate the radio frequency behavior of at least one of an IoT-device, a cellular device, a non-cellular device, a broadcasting device, a radio device, a satellite, a navigation device and a radar further improving the quality of the data set.

In order to provide a reliable and cost efficient device, the radio frequency receiver may be at least one of a software defined radio and a spectrum analyzer.

In an embodiment, the at least one radio frequency signal generator, the radio frequency receiver and the signal data recorder are connected using cables to reduce interferences. In other word, the signals transferred in the device, like the artificial signals are not over the air (OTA) signals.

For particularly detailed training data sets, the signal data recorder may be configured to record I/Q data of the radio frequency signal received by the radio frequency receiver as at least part of the training data set.

In an embodiment, the device comprises at least two radio frequency signal generators and a power combiner, wherein each of the at least two radio frequency signal generators is connected to an input of the power combiner and the radio frequency receiver is connected to an output of the power combiner. This way, complex training data sets may be created.

The radio frequency receiver receives a combined signal of the at least two radio frequency signal generators, i.e. a combined signal comprising at least two artificial signals.

The combined signal may be regarded as an emulation of a real life signal, for example according to a designed scenario or a representing a real life location.

For reducing noise in the training data set, the radio frequency receiver may be configured to receive a specific band of radio frequency signals only.

In an embodiment, the device comprises a control circuit or controller for controlling the at least one radio frequency signal generator to control at least one characteristic of the at least one artificial signal generated by the at least one radio frequency signal generator. This way, complex and/or changing artificial signals may be generated.

The controller may be a scenario controller, i.e. characteristics of multiple artificial signals are controlled according to a predefined scenario by the controller to create a combined signal according to the scenario.

For example, the at least one characteristic of the at least one artificial signal is at least one of fading, emulated antenna pattern, Doppler shift and emulated multipath propagation. Using these characteristics, dynamic scenarios may be created.

Further, for above purpose, a method for generating training data sets for signal type recognition is provided. In an embodiment, the method comprises the following steps:

generating at least one artificial radio frequency signal using at least one radio frequency signal generator, receiving the at least one artificial radio frequency signal generated by the at least one radio frequency signal generator by a radio frequency receiver connected to the at least one radio frequency signal generator, and storing the radio frequency signal received by the radio frequency receiver as a training data set by a signal data recorder connected to the radio frequency receiver.

The features and advantages discussed with respect to the device also apply to the method and vice versa. In some embodiments, the method may comprise steps corresponding to the tasks that the components of the system are configured to perform.

For example, the I/Q-data of the radio frequency signal received by the radio frequency receiver, i.e. the combined signal, is stored as at least part of the training data set.

In an embodiment, the at least one artificial radio frequency signal is a signal according to a predefined signal type. The signal type of at least one of the artificial signals is, for example, the signal type to be recognized.

Further, a plurality of artificial radio frequency signals may be generated according to a predefined scenario. The plurality of artificial radio frequency signals may be generated using one or more radio frequency generators controlled by a control circuit or controller.

In an embodiment, a machine learning circuit or module is trained to recognize the predefined signal type using the training data set. As such, no real life measurements are necessary for training the machine learning module.

For signal type recognition, a real life signal is transmitted to the trained machine learning module and the machine learning module recognizes signals of the predefined signal type in the real life signal. The real life signal is the signal in which the signal type is to be recognized.

Further, for above purpose, a data set for signal type recognition is provided. The data set in an embodiment is generated by:

generating at least one artificial radio frequency signal using at least one radio frequency signal generator, receiving the at least one artificial radio frequency signal generated by the at least one radio frequency signal generator by a radio frequency receiver connected to the at least one radio frequency signal generator, and storing the radio frequency signal received by the radio frequency receiver as a training data set by a signal data recorder connected to the radio frequency receiver.

For example, the data set comprises I/Q-data of the radio frequency signal received by the radio frequency receiver.

The features and advantages discussed with respect to the device and/or the method also apply to the data set and vice versa.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
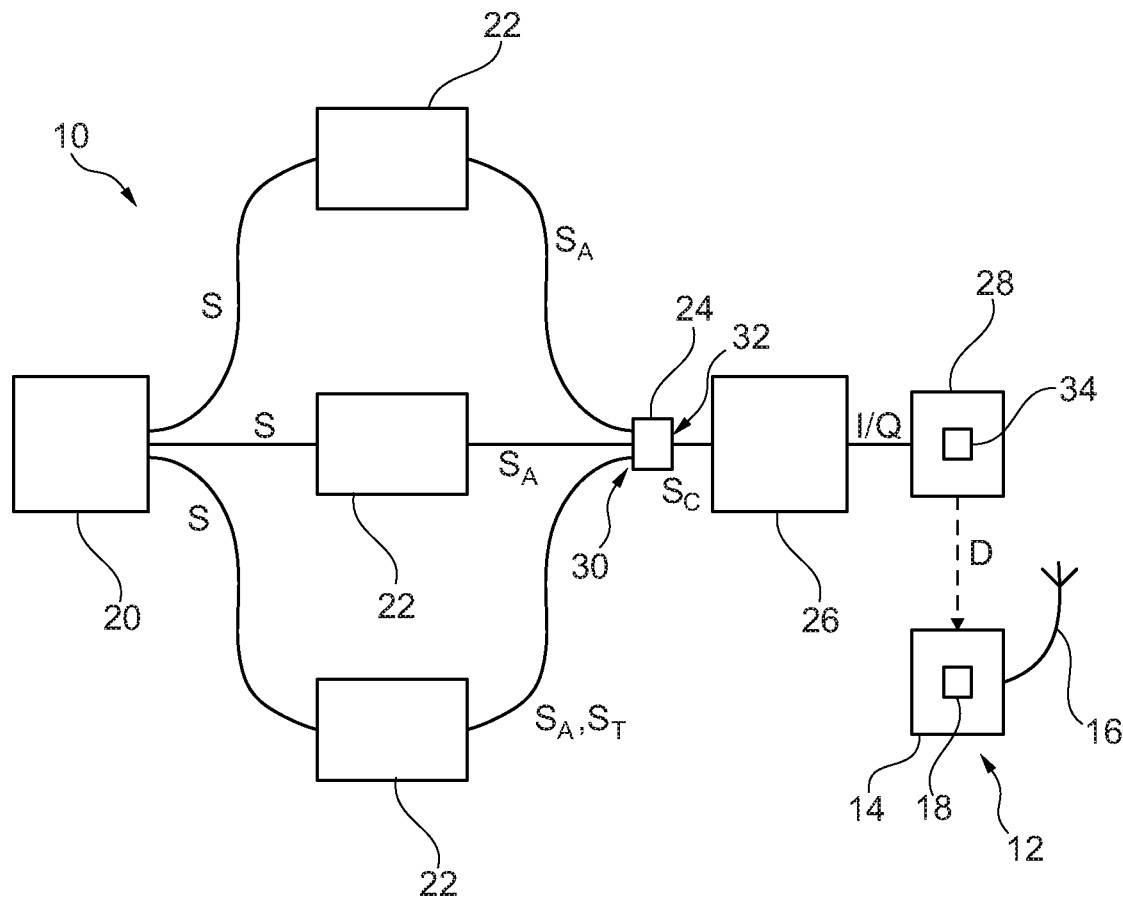
FIG. 1 schematically shows an example of a device for signal type recognition and an example of a device for generating training data sets according to an embodiment of the disclosure.

FIG. 1 shows schematically a device 10 for generating training data sets D for signal type recognition and a device 12 for signal type recognition. The device 12 for signal type recognition comprises a control circuit or control unit 14 and an antenna 16. The control unit 14 has a trained machine learning circuit or module 18 and is thus configured to recognize a predefined signal type from a plurality of signals, usually corresponding to a real life signal, received with the antenna 16.

The trained machine learning module 18 has been trained using at least one training data set D for signal type recognition. The machine learning module 18 may be a trained artificial neural network or the like.

The device 10 comprises at least one, in the shown embodiment three radio frequency signal generators 22 (RF signal generator), a control circuit or controller 20, a power combiner 24, a radio frequency receiver 26 (RF receiver) and a signal data recorder 28. The controller 20 is connected to each of the RF signal generators 22 for controlling the RF signal generators 22. The RF signal generators 22 are each connected to an input 30 of the power combiner 24. An output 32 of the power combiner 24 is, in turn, connected to the RF receiver 26. The RF receiver 26 is connected to the signal data recorder 28.

The connections between the RF signal generator 22, the power combiner 24, the RF receiver 26 and the signal data recorder 28, and possibly also the connections between the controller 20 and the RF signal generators 22 are cable-bound connections, i.e. the components 20-28 are connected via cables. Thus, signal transfer between the RF signal generator 22, the power combiner 24, the RF receiver 26 and the signal data recorder 28 is not performed over the air.

The RF signal generators 22 are configured to generate and emit radio frequency signals (RF signals), one or multiple signals simultaneously. These signals are called artificial signals in the following in particular to delimit these signals from signals emitted from actual functioning devices for the respective service.

The signal class of the RF radio frequency signals may be a 5G signal, a LTE signal, a FDD/HSPA/HSPA+signal, a GSM/EDGE/EDGE Evolution signal, a TD-SCDMA signal, a WLAN signal, a WiMAX signal, a GNSS signal, a OneWeb signal, a DVB signal, a OFDM signal, a radar signal or a signal according to a standard used by IoT-devices.

Standards used by IoT-devices may be an M2M (machine to machine), a V2V (vehicle to vehicle), or a V2I (vehicle to infrastructure) standard. GNSS signals may be a GPS signal, Glonass signal, a Galileo signal, a BeiDou signal and a QZSS/SBAS signal.

A single RF signal generator 22 may be capable of generating signals according to each of the signal classes. It is of course conceivable, that one of the RF signal generators 22 is only capable of generating signals according to a single or a group of signal classes, for example GNSS signals, and another one of the RF signal generators 22 is capable of generating signals of other signal classes, for example cellular signals, like 5G signals.

The RF signal generators 22 are configured to emulate the radio frequency behavior of an IoT-device, a cellular device, a non-cellular device, a broadcasting device, a radio device, a satellite, for example of a GNSS system, a navigation device and/or a radar.

In order to do so, the RF signal generator 22 emulating such a device emits radio frequency signals resembling the RF signals emitted by such a device, for example in a specific class.

The signals emitted by the RF signal generators 22 are analog signals.

The RF receiver 26 may be a software defined radio and/or a spectrum analyzer and one of its input is connected to the power combiner 24, and thus, the RF signal generators 22. The RF receiver 26 may be configured to receive only a specific band of radio frequency signals, i.e. functions as a bandpass filter for the RF signals received from the RF signal generators 22. Further, the RF receiver 26 comprises an analog-to-digital converter for digitizing the signals from the RF signal generator 22.

The signal data recorder 28 is connected to an output of the RF receiver 26 and comprises a storage 34, for example a hard disk, a solid-state disk, or other computer readable storage media for storing signals and/or data received from the RF receiver 26. The signal data recorder 28 may be configured to report I/Q data in real time.

The controller 20 is configured to control each of the RF signal generators 22, more precisely the RF signal generated by the RF signal generator 22. The controller 20 is therefore in control of the RF signal received by the RF receiver 26 and thus the signal recorded by the signal data recorder 28.

In an embodiment, the controller 20 may be a computer running a control software for RF signal generators 22. The software may be a Pulse Sequencer software or a vector signal software. For example, the controller 20 comprises at least one predefined scenario on which the training data set D is to be created.

The scenario comprises a time sequence of a single or multiple radio frequency signals of the same or different classes. The scenario may also contain information about fading of a signal at a specific time in the scenario, information about an antenna pattern of an emulated antenna used to virtually emit one of the RF signals, the Doppler shift of the RF signals due to a virtual relative velocity between the sender and the receiver, information about possible multipath propagations and the like.

A scenario may be regarded as a full score of the RF signals present at a single location in a given environment or at a specific location. It may be regarded as the score of a real life signal.

In other words, the scenario describes all or a plurality of RF signals that would be measured at a similar location in real life. It is of course conceivable, that the scenario is fully hypothetical.

Information about the RF frequency signals and their characteristics present in an environment may be gained by actual real life measurements.

For example, in a typical urban environment, at least one RF signal of a GNSS, 5G and LTE, RF signals of multiple telecommunication providers, typically WLAN signals close by access points, DVB signals of television broadcasts and much more signals are present.

The scenario also includes a RF signal according to a predefined signal type being the signal type ST to be recognized. The signal type to be recognized ST may be a specific signal class and/or other characteristics of the RF signal, like amplitude, content or the like.

Figure 2:
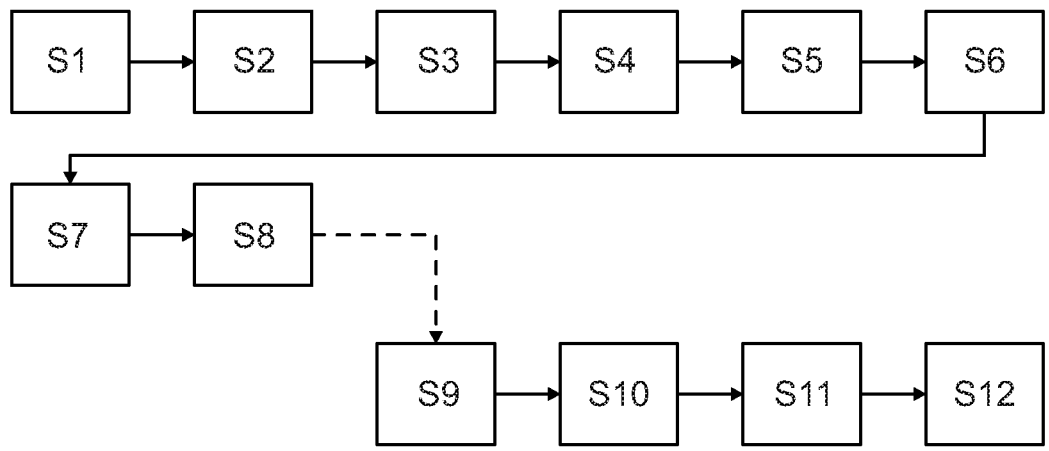
FIG. 2 shows a representative flow-chart of a method for generating training data sets according to an embodiment of the disclosure.

In order to generate the training data set D, the device 10 in some embodiments carries out the method illustrated in FIG. 2.

In a first step S1, a scenario is created and/or loaded by the controller 20.

To do so, the artificial signals to be present in the training data set D are selected and their characteristics and time sequence is set. The scenario S is then replayed, meaning that in the next step S2, the controller 20 controls the RF signal generators 22 according to the scenario S.

The controller 20 then controls the RF signal generators 22 so that each of generators generates and emits artificial RF signals according to the scenarios, just like the conductor conducts an orchestra according to the full score.

The RF signals generated by the RF signal generators 22 are artificial signals of a specific signal class with specific characteristics emulating and/or resembling signals in real life of. For example, signals of IoT-devices, cellular devices, non-cellular devices, broadcasting devices, radio devices, satellites, navigation devices and/or radars. The RF signal generators 22 may thus be seen as emulators of such devices.

For example, the artificial signals SA are entirely predetermined by the scenarios, i.e. that the scenarios also define the contents of the artificial signals SA.

It is also possible that the scenarios define only—for a specific signal—the signal class, the duration, the amplitude, impossibly fading of a signal and the contents of this specific artificial signal SA are created randomly by the controller 20 or the corresponding RF signal generator 22.

Of course, the contents of the signals may also be partly random and partly predetermined by the scenarios.

In most cases, the signal according to the predefined signal type ST to be recognized is fully predefined in the scenarios, including its contents. It is also possible, that the contents are only defined as "white noise" which is then created by the controller 20 or the RF signal generator 22.

The signals generated by the RF signal generators 22 are then combined in the power combiner 24 (step S3) and transferred to the RF receiver 26. The power combiner 24 therefore creates a combined signal Sc from the plurality of artificial signals SA.

In the next step S4 the RF receiver 26 receives the combined signal Sc. The RF receiver 26 may filter the combined signal Sc to receive only a specific band of the artificial radio frequency signals Sc (step S5). Prior to or after filtering, the receiver may also digitize the combined signal Sc (step S6).

Further, in step S7, the RF receiver 26 generates I/Q data of the combined signal Sc and transmits the I/Q data to the signal data recorder 28.

In step S8, the signal data recorder 28 stores the I/Q date in the storage 34. The stored I/Q data forms or is part of the training data set D to be created by the device 10 for generating training data sets.

The signal data recorder 28 may also add additional information to the I/Q data as part of the training data set D, for example information about the emulated scenario, the signal type ST to be recognized, or the like.

It is also conceivable, that the RF receiver 26 transmits the combined signal Sc to the signal data recorder 28, even possibly not digitized. In this case, the signal data recorder 28 may record the combined signal SC and/or convert the combined signal SC to I/Q data and store the I/Q data as the training data set D. Also digitizing may be done by the signal data recorder 28.

Figure 3:
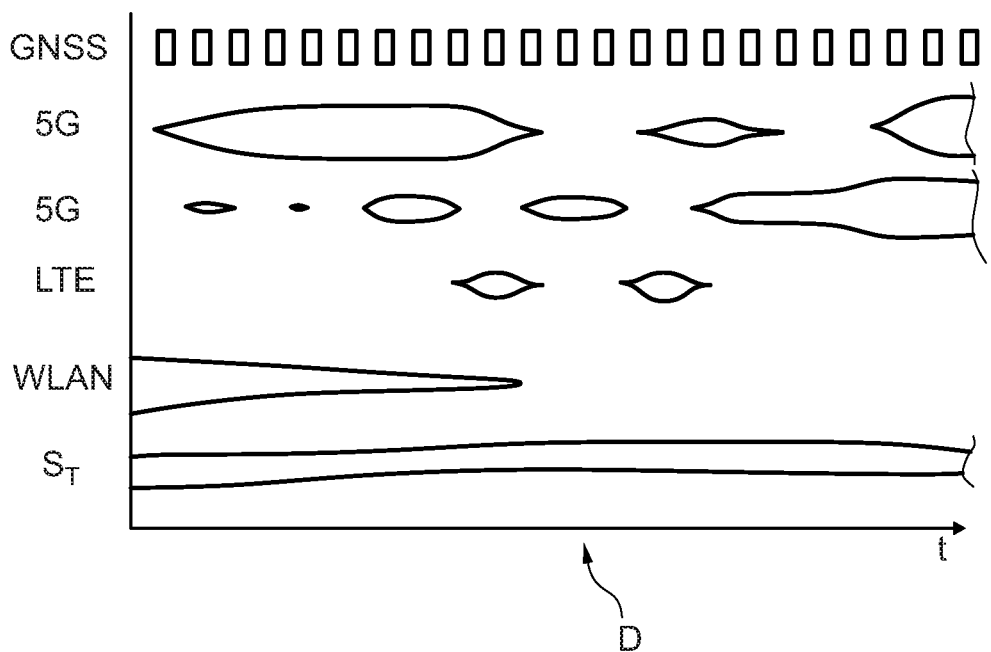
FIG. 3 shows an illustration of a training data set according to the disclosure.

FIG. 3 shows very schematically the data set D as a timeline of various artificial RF signals occurring over time t. The scenarios may also be illustrated in a very similar manner.

For recognizing a signal type in a real life signal, i.e. a combination of many unknown RF signals, and therefore identifying a specific device, like a jammer, the following steps may further be performed.

In step S9, the training data set D is applied to the machine learning module 18 to train the machine learning module 18 to recognize the predefined signal type in the training data set D.

For a proper training, the training has to be repeated with further training data sets D to obtain a trained machine learning module 18.

The trained machine learning module 18 may then be implemented in the device 12 for signal type recognition (step S10).

Figure 4:
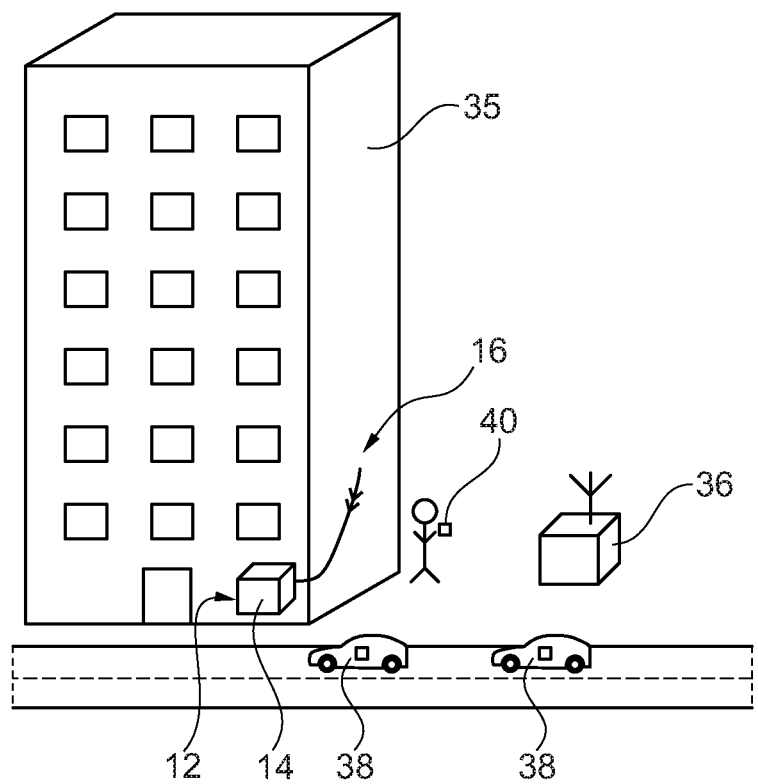
FIG. 4 shows a streetscape and a device for signal type recognition according to an embodiment of the disclosure using the training data set.

As shown in FIG. 4, the device 12 for signal type recognition may then be placed in a real world environment.

FIG. 4 shows a streetscape, i.e. part of a city having a building 35, a street with cars, pedestrians walking by and an interfering device 36, like a jammer.

The function of the building 35 may rely on wireless RF signal transmission with other external devices, which would be disturbed by an interfering device like device 36.

The device 12 for signal type recognition is placed in the building and thus, in step S11, the antenna 16 picks up the real life signal present at the building. The real life signal comprises many unknown RF signals, for example signals of IoT-devices 38 in the cars passing by and of handheld devices 40 carried by pedestrians.

Also, the real life signal will comprise GNSS signals, DVB signals and cellular signals, like 5G, LTE or the like.

The received real life signal is then transmitted to the trained machine learning module 18, which in turn identifies the predefined signal type it is trained to recognize (step S12). The identified signal is the signal of the interfering device 36.

Once, the interfering device 36 and its signal have been identified (or, in general, the source of the signal type ST to be recognized has been identified), counter measures may be applied.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A device for generating training data sets for signal type recognition, comprising: at least one radio frequency signal generator for generating at least one artificial radio frequency signal; a radio frequency receiver connected to the at least one radio frequency signal generator for receiving the at least one artificial radio frequency signal generated by the at least one radio frequency signal generator; and a signal data recorder connected to the radio frequency receiver for storing the radio frequency signal received by the radio frequency receiver as a training data set configured for training a machine learning module to recognize a predefined signal type; wherein the at least one radio frequency signal generator includes at least two radio frequency signal generators, the at least two radio frequency signal generators being configured to generate artificial radio frequency signals that emulate the radio frequency behaviors of at least two of: an IoT-device, a cellular device, a non-cellular device, a broadcasting device, a radio device, a satellite, a navigation device or a radar, wherein the device further comprises a power combiner, wherein each of the at least two radio frequency signal generators is directly connected to an input of the power combiner by a cable bound connection and the radio frequency receiver is connected to an output of the power combiner by a cable-bound connection, such that the artificial radio frequency signals generated by the at least two radio frequency signal generators are combined by the power combiner, thereby obtaining a combined signal that is forwarded to the radio frequency receiver.

2. The device according to claim 1, wherein the at least one artificial radio frequency signal is a signal according to the predefined signal type.

3. The device according to claim 2, wherein the signal type of the at least one artificial radio frequency signal is the signal type to be recognized.

4. The device according to claim 1, wherein the signal class of the at least one artificial radio frequency signal is a 5G signal, a LTE signal, a FDD/HSPA/HSPA+signal, a GSM/EDGE/EDGE Evolution signal, a TD-SCDMA signal, a WLAN signal, a WiMAX signal, a GNSS signal, a OneWeb signal, a DVB-S2/DVB-S2X signal, a OFDM signal, a radar signal or a signal according to a standard used by IoT-devices.

5. The device according to claim 4, wherein, within the standard of the predetermined signal class of the at least one artificial radio frequency signal, the contents of the at least one artificial radio frequency signal are entirely predetermined, entirely random or partly random and partly predetermined.

6. The device according to claim 1, wherein the radio frequency receiver is at least one of a software defined radio and a spectrum analyzer.

7. The device according to claim 1, wherein the at least one radio frequency signal generator, the radio frequency receiver and the signal data recorder are connected using cables.

8. The device according to claim 1, wherein the signal data recorder is configured to record I/Q data of the radio frequency signal received by the radio frequency receiver as at least part of the training data set.

9. The device according to claim 1, wherein the radio frequency receiver is configured to receive a specific band of radio frequency signals.

10. The device according to claim 1, further comprising a control circuit for controlling the at least one radio frequency signal generator to control at least one characteristic of the at least one artificial radio frequency signal generated by the at least one radio frequency signal generator.

11. The device according to claim 10, wherein the at least one characteristic of the at least one artificial radio frequency signal is at least one of fading, emulated antenna pattern, Doppler shift and emulated multipath propagation.

12. A method for generating training data sets for signal type recognition, comprising: generating at least one artificial radio frequency signal using at least one radio frequency signal generator; receiving the at least one artificial radio frequency signal generated by the at least one radio frequency signal generator by a radio frequency receiver connected to the at least one radio frequency signal generator; and storing the radio frequency signal received by the radio frequency receiver as a training data set by a signal data recorder connected to the radio frequency receiver, wherein the training data is set is configured for training a machine learning module to recognize a predefined signal type, wherein the at least one radio frequency signal generator includes at least two radio frequency signal generators, wherein the radio frequency behaviors of at least two of an IoT-device, a cellular device, a non-cellular device, a broadcasting device, a radio device, a satellite, a navigation device or a radar are emulated by artificial radio frequency signals generated by the at least two radio frequency signal generators, wherein a power combiner is provided, wherein each of the at least two radio frequency signal generators is directly connected to an input of the power combiner by a cable-bound connection and the radio frequency receiver is connected to an output of the power combiner by a cable-bound connection, wherein the method further comprises combining the artificial radio frequency signals generated by the at least two radio frequency signal generators, thereby obtaining a combined signal that is forwarded to the radio frequency receiver.

13. The method according to claim 12, wherein the at least one artificial radio frequency signal is a signal according to the predefined signal type.

14. The method according to claim 13, wherein the signal type of the at least one artificial radio frequency signal is the signal type to be recognized.

15. The method according to claim 12, wherein a plurality of artificial radio frequency signals is generated according to a predefined scenario.

16. The method according to claim 12, wherein a real life signal is transmitted to the trained machine learning module and the machine learning module recognizes signals of the predefined signal type in the real life signal.

17. A non-transitory computer-readable medium comprising instructions configured to cause a computer system to perform a method for generating a data set for signal type recognition, the method comprising: generating at least one artificial radio frequency signal using at least one radio frequency signal generator; receiving the at least one artificial radio frequency signal generated by the at least one radio frequency signal generator by a radio frequency receiver connected to the at least one radio frequency signal generator; and storing the radio frequency signal received by the radio frequency receiver as a training data set by a signal data recorder connected to the radio frequency receiver, wherein the training data set is configured for training a machine learning module to recognize a predefined signal type, wherein the at least one radio frequency signal generator includes at least two radio frequency signal generators, wherein the radio frequency behaviors of at least two of an IoT-device, a cellular device, a non-cellular device, a broadcasting device, a radio device, a satellite, a navigation device or a radar are emulated by artificial radio frequency signals generated by the at least two radio frequency signal generators, wherein a power combiner is provided, wherein each of the at least two radio frequency signal generators is directly connected to an input of the power combiner by a cable-bound connection and the radio frequency receiver is connected to an output of the power combiner by a cable-bound connection, wherein the method further comprises combining the artificial radio frequency signals generated by the at least two radio frequency signal generators, thereby obtaining a combined signal that is forwarded to the radio frequency receiver.

\* \* \* \* \*